W. M. FULTON.
COLLAPSIBLE AND EXPANSIBLE VESSEL.
APPLICATION FILED FEB. 19, 1915.
1,167,895.  Patented Jan. 11, 1916.
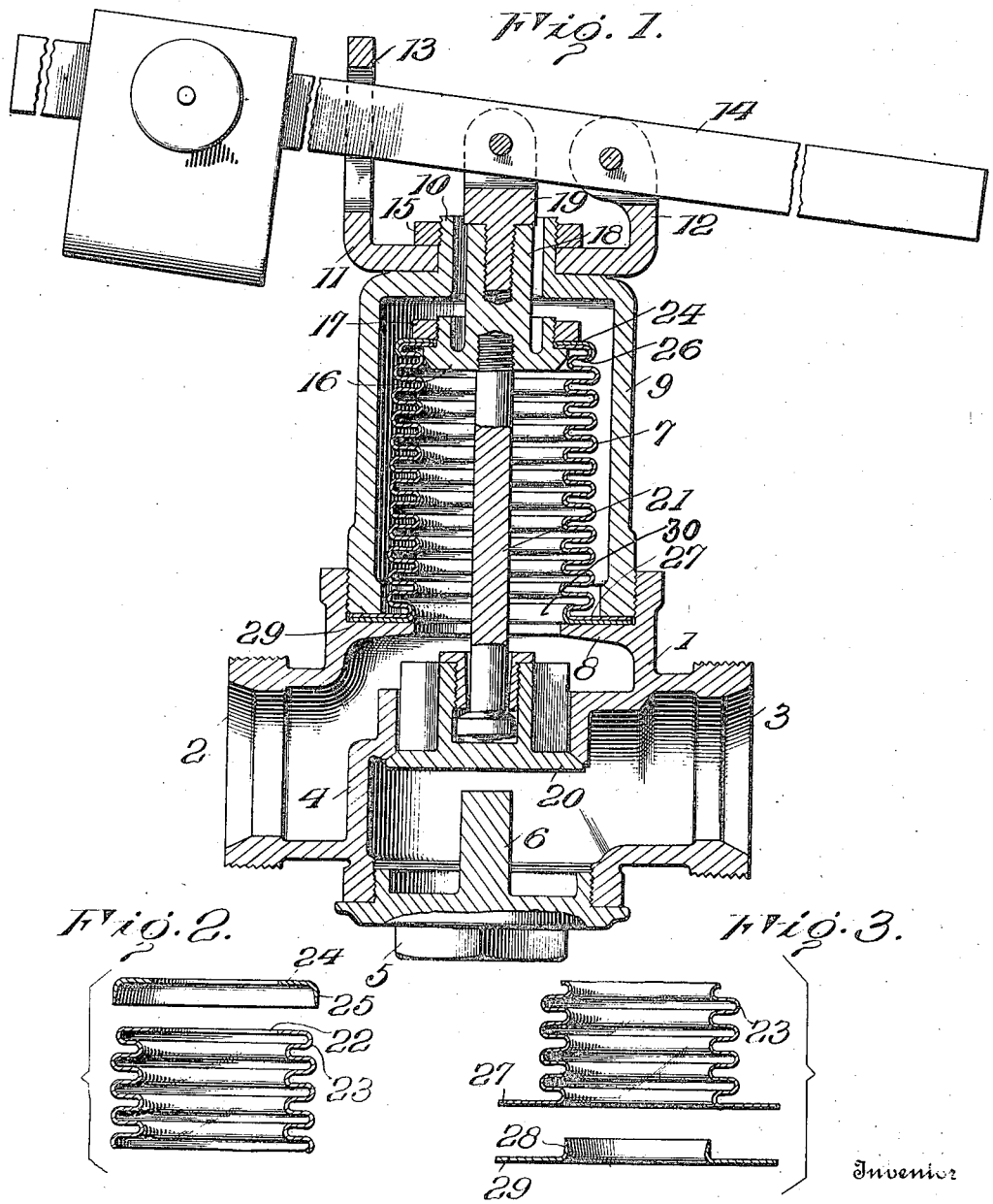

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

COLLAPSIBLE AND EXPANSIBLE VESSEL.

1,167,895. Specification of Letters Patent. Patented Jan. 11, 1916.

Application filed February 19, 1915. Serial No. 9,301.

*To all whom it may concern:*

Be it known that I, WESTON M. FULTON, resident of Knoxville, Tennessee, whose post-office address is care of The Fulton Company, White avenue and Second street, Knoxville, Tennessee, have invented a new and useful Improvement in Collapsible and Expansible Vessels, which invention is fully set forth in the following specification.

This invention relates to improvements in corrugated collapsible and expansible tubular metal walls, and more particularly to the manner of reinforcing the end connecting flanges of such walls. Tubular walls of the class referred to are made of very thin metal and possess the ability of extension and contraction in a marked degree. This vibratory quality fits them for a variety of uses in connection with fluids subject to variation of temperature or pressure, such as in thermostats and in fluid pressure devices. Difficulty has been experienced in making durable connections between the ends of the corrugated wall and the rigid parts of the apparatus in which these thin flexible walls are used. These connections have heretofore been made by spinning flanges at the ends of the corrugated tubular wall and then clamping the annular flange against a shoulder or between two clamping rings. Whether the flanges are interior flanges or exterior flanges they have heretofore been a source of weakness to the vibratory wall because cracks in the flanges appear in the vicinity of the edge of the clamping ring long before the bends in the corrugations give out.

My invention overcomes the above objection and has for its object to provide reinforcing flanges for the flanged ends of corrugated collapsible and expansible vessels adapted to give to the end connecting portions of the wall a durability equal to, if not greater than, that of the corrugations of the wall and which are simple in construction, require no solder and afford fluid tight joints. To this end, I provide an annular flange plate to match the end flange of the wall and provide thereon a raised portion formed either on the outer rim or on the interior rim of the reinforcing flange and adapted to clasp around the first corrugation into which the end flange of the corrugated wall merges.

I have described my improvement by way of example in connection with a corrugated, collapsible and expansible vessel used in a reducing and regulating valve, but it is to be understood that the improvement may be used wherever the flanged ends of a flexible corrugated vessel are to be secured to supporting parts.

Reference is here made to the accompanying drawings, which are intended as illustrations to assist the description of the invention but not as defining the limits thereof.

Figure 1 is a longitudinal sectional view through a reducing and regulating valve, having a corrugated collapsible and expansible vessel provided with my improvement. Figs. 2 and 3 are sectional detail views showing the manner of applying both external and internal reinforcing flanges to the flanged ends of corrugated vessels.

Referring to the drawings, Fig. 1 shows a valve casing 1 having an externally threaded inlet connection 2 and a similar outlet connection 3. A partition 4, having a valve controlled port, divides the valve chamber into a high pressure receiving compartment and a low pressure delivering compartment. In line with the port opening in the partition and on opposite sides thereof, are openings in the valve casing wall, one of which is closed by a screw plug 5 having a valve limiting member 6, and the opposite opening in the wall is closed by a corrugated collapsible and expansible vessel 7, the lower flanged end of which is secured against a ledge 8 within the casing wall by means of a bonnet 9 adapted to be screwed against the flange of the vessel. The top of the bonnet 9 is provided with a threaded neck 10 over which slips a bracket member 11 provided with upright arms 12 and 13, one of which is adapted to form a fulcrum support for a weighted damper lever 14, and the other is adapted to guide the lever in its rocking movements. The bracket member is held in place by a nut 15 screwed onto neck 10. The upper end of the vessel 7 is provided with a closure 16 which is supported by the inner flanged end of the vessel by aid of a nut 17 screwed onto a threaded portion of the closure. The closure 16 has a connection with lever 14 through an upward extension 18 and a link 19 having a threaded engagement with extension 18. The closure 16 supports the valve 20 by aid of valve rod 21 which has a threaded connection with the under face of the closure.

The description up to this point recites the features of a well known type of valve and has been given with a view of showing the connection of my improvement with the vibratory vessel in such valve structure.

In Fig. 2 is shown a flexible corrugated wall, the upper end of which has been provided, preferably by a spinning operation, with an internal flange 22 which merges into the first corrugation 23 of the wall and is ready to receive my reinforcing flange 24. The diameter of the corrugated wall through corrugation 23 is preferably less than that through the next outer corrugation and is sufficiently less to receive the rim 25 of the reinforcing flange 24 and permit the peripheral surface of rim 25 to be flush with the outside bends of the wall. The reinforcing flange is stamped from a disk of soft metal, such as brass, copper or the like, and when it is to reinforce an outside corrugation, as in the present instance, the periphery of the disk is formed into a rim 25, the depth of which depends on the width of the corrugation and in every case should be sufficient to clasp around more than half of the curved surface of the corrugation with which it is to be used. The edge of the rim is preferably tapered to a thin edge to better enable it to yield with the bending of the corrugation to which it is applied. The flat annular portion of the reinforcing flange is made to conform with the flat portion of the end flange of the corrugated wall. As shown in Fig. 2, the reinforcing flange is ready to be placed over the end of the corrugated wall after which the rim 25 is made to conform with the bend 23 by means of suitable shaping tools. It will then assume the form shown in Fig. 1 at 26 with the rim hugging the outside of the bend and with the flat annular portion resting on the flat portion of the end flange of the vessel 7.

In Fig. 3 a flexible corrugated wall is shown which has been provided with an external flange portion 27 preferably formed thereon by a spinning operation. This flange merges into the first inner corrugation of the corrugated wall which has at this point a diameter preferably greater than the diameter of the next inner corrugation, the excess being sufficient to permit the reception of a shank 28 of an inner reinforcing flange 29, while permitting the inner surface of the shank to be flush with the inner corrugations of the wall. The reinforcing flange in the present instance is designed to reinforce an inner corrugation, and therefore the upturned portion of the flange is formed around the opening in the disk from which it is made. The shank 28 is made long enough to clasp more than half the surface of the first corrugation when it is inserted in the end of the wall and expanded into holding position by spinning or other operation. The shank 28 is preferably thinned as described above, and the flat portion of the reinforcing flange conforms to the end flange 27 of the corrugated wall. The reinforcing flange in its final form applied to the internal end corrugation is shown in Fig. 1 at 30.

The operation of my reinforcing flange is as follows. It is assumed that the corrugated flexible wall 7 is subjected to vibratory movements due to the fluctuation of fluid pressures in the valve chamber 1. Each extension of the corrugated wall of vessel 7 subjects the bends and portions of the wall connecting the bends to strains. The end flange portions 24, 28, which are integral with the end corrugations and which have heretofore been relied on alone for securing the ends of the tubular wall to its associated parts, have been subjected to greater bending strains than the flat connecting portions between the bent portions of the corrugated wall. This is because the flange portions are necessarily wider than the connecting flat portions which unite the bent portions, and the extent of bending in the flange portion is greater. The weakest part of the vessel therefore occurred where the vessel was held by the end flanges. This weakness has been overcome and the wall made as strong at the points of connection as at intermediate points, by associating my reinforcing flange with the end flange and the bend into which it merges. The association of the curved rim of the reinforcing flange with the bend or corrugation of the vessel enables the latter bend or corrugation to be held by the reinforcing flange, and thereby transfers the bending strains from the wall flanges 24 or 28 to the corrugations of the wall and therein to be distributed. With a view of further assisting this distribution of strains, the edge of the curved portion of the reinforcing flange is thinned down to secure flexibility therein and prevent an abrupt bending of the wall where this edge terminates.

What is claimed is:

1. In combination, a collapsible and expansible corrugated tubular wall having a flange portion extending from an end corrugation, and a reinforcing flange member for said parts consisting of an annular plate having an edge portion embracing said corrugation and adapted to reinforce said end corrugation and its flange portion.

2. In combination, a collapsible and expansible corrugated tubular wall having a flange portion extending from an end corrugation, the diameter of said wall through said corrugation being greater than that of the next inner corrugation, and a reinforcing flange member consisting of an annular plate having its inner rim turned up and embracing said end corrugation to reinforce the latter and its flange portion and flush with the inner corrugation of the tube.

3. In combination, a collapsible and expansible corrugated tubular wall having a flange portion extending from an end corrugation, and a flange member for reinforcing said parts consisting of an annular plate having one rim turned up and embracing said corrugation and terminating in a flexible reduced edge.

4. In combination, a collapsible and expansible corrugated tubular wall having a flange portion extending from an end corrugation, and a flange member for reinforcing said parts and having a curved portion embracing said corrugation and flush with the corrugation located on the side to which the flange is applied.

5. In combination, a collapsible and expansible corrugated tubular wall having a flange portion extending from an end corrugation, and an annular plate one rim of which engages said flange portion and the other rim of which is turned up to embrace and reinforce said end corrugation.

In testimony whereof I have signed this specification in the presence of two subscribing witnesses.

WESTON M. FULTON.

Witnesses:
B. A. TRIPP,
ROBT. H. ALVES.